United States Patent Office 3,342,893
Patented Sept. 19, 1967

3,342,893
ALKYLATED CONDENSATE OF FORMALDE-
HYDE AND A DIAMIDE OF AN m-PHENYL-
ENE DICARBOXYLIC ACID
William D. Emmons, Huntingdon Valley, Andrew Mercurio, Philadelphia, and Francis H. McGrath, Levittown, Pa., assignors to Rohm & Haas Company, Philadelphia, Pa., a corporation of Delaware
No Drawing. Filed Nov. 29, 1963, Ser. No. 327,105
14 Claims. (Cl. 260—850)

The present invention concerns novel thermosetting compositions adapted to be used for coating and impregnating purposes. It is particularly concerned with this type of composition for the decoration and protective coating of metals which are subjected to both indoor and outdoor use and exposure.

United States Patent No. 2,364,737 to McGrew discloses the preparation of various ethers of N-methylol polycarbonamides. Among the polyamides mentioned are several unsaturated compounds such as terephthalamide and fumaramide, a number of saturated aliphatics such as adipamide, azelamide, sebacamide and hexahydroterephthalamide, and various other diamides which in general are comparatively expensive and unavailable commercially. In general, the derivatives disclosed in the patent are distinctive N,N-bis(alkoxymethyl) derivatives of the respective diamides. They have one or more deficiencies or disadvantages, such as inadequate resistance of coatings obtained from compositions comprising them toward moisture, solvents, or heat; lack of durability on outdoor exposure; poor solubility in conventional solvents; tendency to crystallize out of solution on standing or storage even over a short period of time, such as from 1 to 6 hours; poor limited compatibility with other resinous or resin-forming components of coating or impregnating compositions, such as aminoplasts, phenoplasts, alkyds, or polyepoxide resins; and impracticality from a commercial standpoint because of inordinate cost or unavailability. The ethers taught by McGrew are disclosed as being useful in forming resins with polyhydric compounds or in modifying alkyd and urea-formaldehyde resins. In these compositions, the ethers are disclosed as improving the flexibility of the resulting product.

Now, in accordance with the present invention, it has been discovered that certain specific classes of acrylic resins modified by various ethers of N-methylol polycarbonamides are characterized by an unusual combination of hardness, flexibility and adhesion. Further, novel ethers of N-methylol polycarbonamides have been found which do not suffer from the disadvantages of the ethers of N-methylol polycarbonamides heretofore known. Thus, the novel ethers are not monomeric although, as compared with ethers of N-methylol derivatives of linear polyamide condensation polymers, the novel condensation products are of quite low molecular weight. These novel esters have, as compared to the ethers (1) of the N-methylol monomeric polyamides and (2) of the N-methylol derivatives of the previously known linear polyamide condensation polymers, the advantages of providing greater ease of solution and solubility in a wider range of solvents, greater solution concentrations and consequently more facile preparation of coatings of adequate thickness with a single application, a wider range of compatibilities with other resins or polymers, greater uniformity of the films obtained on coating and impregnation and, as compared with the ethers of the N-methylol derivatives of the previously known linear polyamide condensation polymers, better penetration of porous substrates. It is particularly noteworthy that the novel ethers can be stored over long periods of time such as several weeks and frequently many months without encountering serious tendencies of partial crystallization.

The compositions of the present invention comprise a solution in an organic solvent of a mixture of (A) about 70 to 95% by weight of a water-insoluble addition copolymer of monoethylenically unsaturated monomers comprising at least one derivative of an alpha, beta-monoethylenically unsaturated acid selected from the group consisting of (1) amides having a group of the formula

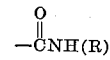

wherein R is selected from the group consisting of H, alkyl groups having 1 to 4 carbon atoms, hydroxyalkyl groups having 1 to 4 carbon atoms, and alkoxyalkyl groups having 2 to 6 carbon atoms, and (2) free hydroxyl-containing esters, and (B) about 5 to 30% by weight of an alkylated condensate of formaldehyde and a diamide of a dicarboxylic acid having 4 to 12 carbon atoms, the alkylation being that obtained with at least one alcohol having 1 to 8 carbon atoms.

When the derivative of the alpha,beta-monoethylenically unsaturated acid is an amide, it is preferred that such amide comprise about 3 to 20% by weight of the copolymer. Conversely, when the derivative is a free hydroxyl-containing ester, it is preferred that the hydroxyl-containing ester comprise about 5 to 40% by weight of the copolymer.

Copolymer of monoethylenically unsaturated monomers

The unsaturated acids from which the amide and/or ester is derived may be monocarboxylic or polycarboxylic. Examples include acrylic, methacrylic, itaconic, maleic, fumaric, crotonic, alpha-hydroxyalkyl-acrylic, aconitic, citraconic, alpha-acryloxyacetic, and alpha-methacryloxyproprionic. Representative amides include acrylamide, methacrylamide, itaconamide, itaconamic acid, maleamic acid, fumaramic acid, the N-methylol derivatives of any of these amides, the N-methyl to N-butyl substituted derivatives of any of these amides, the N-beta-hydroxyethyl, the N-beta-hydroxypropyl, and other N-hydroxypropyl and N-hydroxybutyl-substituted derivatives of the first-named amides, and the N-methoxymethyl, N-butoxymethyl N-ethoxyethyl, and other N-alkoxyalkyl-substituted derivatives of the first-named amides. Preferred amides are acrylamide, methacrylamide and itaconamide which preferably will comprise from about 5 to 10% by weight of the copolymer.

Representative esters include 2-hydroxyethyl acrylate, methyl alpha-(hydroxymethyl)-acrylate, ethyl alpha-(hydroxymethyl)-acrylate, butyl alpha-(2-hydroxyethyl)-acrylate, 2-hydroxypropyl acrylate or methacrylate, 3-hydroxypropyl acrylate or methacrylate, methyl alpha-(2-hydroxypropyl)-acrylate, ethyl alpha-(3-hydroxypropyl)-acrylate, 4-hydroxybutyl acrylate, 5-hydroxyamyl acrylate, 6-hydroxyhexyl acrylate, 7-hydroxyheptyl acrylate, 8-hydroxyoctyl acrylate, 9-hydroxynonyl acrylate, 10-hydroxydecyl acrylate, 2-hydroxyethyl methacrylate, 6-hydroxyhexyl methacrylate, 8-hydroxyoctyl methacrylate, 10-hydroxydecyl methacrylate, 3-hydroxypropyl crotonate, 5-hydroxyamyl crotonate, 6-hydroxyhexyl crotonate, 7-hydroxyheptyl crotonate, 10-hydroxydecyl crotonate, di(2-hydroxyethyl maleate, di(4-hydroxybutyl)maleate, di(6-hydroxyhexyl)maleate, di(9-hydroxynonyl)maleate, di(10-hydroxydecyl)maleate, di(2-hydroxyethyl)-fumarate, di(4-hydroxybutyl)fumarate, di(6-hydroxyhexyl)fumarate, di(10-hydroxydecyl)fumarate, and the like. Additionally, other substituents may be incorporated into the alkyl chain, including secondary hydroxy groups, halide radicals, nitrile radicals, and the like, such as 2,3-dihydroxypropyl acrylate, 3,5-dihydroxyamyl crotonate, 6,10-dihydroxydecyl methacrylate, di-2,6-dihydroxyhexyl maleate, and di-2-chloro 7-hydroxyheptyl fumarate. In all of the hydroxy-containing esters, the hydroxyl of each hydroxyalkyl group is at least two carbon atoms removed from the carbon atom of the adjacent —COO— radical in the ester.

The amide and/or hydroxy-containing ester may be copolymerized with one or more other copolymerizable monomers, such as the nitriles and esters af acrylic or methacrylic acid which may be generically represented by the formula

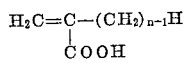

wherein $n$ is an integer having a value of 1 to 2. The esters may be those of benzyl alcohol or of any saturated monohydric alcohol having 1 to 18 or more carbon atoms including cyclohexanol, alkyl-substituted cyclohexanols and alkanols having up to 18 or more carbon atoms, and preferably from 1 to 8 carbon atoms. Examples include methyl acrylate, methyl methacrylate, ethyl acrylate, butyl acrylate, butyl methacrylate, 2-ethylhexyl acrylate and octadecyl acrylate. Other monomers that can be used include vinyl esters, such as vinyl acetate and vinyl chloride, vinylidene chloride, vinyl aromatic hydrocarbons, having 8 to 16 carbon atoms, especially styrene and the vinyl toluenes (o, m, p, or mixtures), vinyl ($C_1$–$C_4$)-alkyl ethers, such as vinyl ethyl ether, and vinyl ($C_1$–$C_4$)-alkyl sulfides, such as vinyl methyl sulfide. In general, the monomers copolymerized with the amide or hydroxyl-containing component should be hydrophobic as those mentioned herein. However, the copolymer may include from 1 to 10%, preferably not over 5% by weight, of hydrophilic monomers other than the amide or hydroxyl ester component. Examples include acids, such as acrylic acid, methacrylic acid, or itaconic acid; amines, such as dimethylaminoethyl acrylate or N-dimethylaminoethyl acrylamide; etc.

In general, the copolymers are made by solution polymerization in an organic solvent which can then constitute part of the solvent in the final coating or impregnating composition. Examples include the aromatic hydrocarbons, such as benzene, toluene, and xylene; the alcohols, such as n-butanol, sec-butanol, tert-butanol, pentanols, hexanol, and cyclohexanol; ketones such as methyl isobutyl ketones; ethers such as dioxane; and esters, such as 2-ethoxyethyl acetate. A mixture of solvents may be used. Solvent interchange can also be used whereby the solvent used in preparation is replaced by another solvent for use in the coating composition.

Preferably, the molecular weight of the polymers is at least 800 and may be up to 150,000 viscosity average or higher. The preferred copolymers have molecular weights in the range of about 5,000 to 30,000 viscosity average. Known methods are used to produce the copolymers of the desired molecular weight.

*Alkylated diamide/formaldehyde condensate*

The alkylated diamide/formaldehyde condensate may be composed essentially of specific compounds such as the N,N′-dialkoxymethyl derivative of any of the diamides set out herein. Examples of the diamides are those formed from succinic acid, adipic acid, glutaric acid, sebacic acid, isophthalic acid or anhydride, tetrahydrophthalic acid or anhydride, and 1,2-cyclohexanedicarboxylic acid or anhydride. On the other hand, preferred compositions are those comprising a mixture of such compounds or a mixture of essentially amorphous, partially polymerized or partially resinified condensates of this type whether derived from a single diamide and a single alcohol or from a mixture of either or both of these component materials. The following is a general description of one way of making the preferred partially polymerized condensates:

The condensates used in the compositions of the present invention may be made by first reacting the diamide with formaldehyde at a pH of 2 to 6, and preferably about 3 to 4, optionally in an aqueous medium in which the water constitutes about 25% to 50% by weight, based on the entire weight of the reaction mixture consisting essentially of the diamide, formaldehyde, water, and sufficient acid to provide acidity in the range hereinabove specified. The amount of formaldehyde provided in the reaction mixture is between about 1.8 to 6 moles, and preferably 2 to 3 moles per mole of diamide. Any acid may be used, whether inorganic or organic, to provide the necessary pH condition in the reaction mixture. Thus, hydrochloric, sulfuric, oxalic, succinic, formic, acetic, etc. may be used. Ordinarily, formic acid is preferred. The presence of acid has been found to favor condensation polymerization in the initial stage of reaction with formaldehyde so that the reaction does not stop with the production merely of the N,N′-dimethylol derivative of the diamide. The condensate may be a pure monomer, dimer or trimer. However, in general, the condensate is a mixture of two or more simple compounds as the monomer, dimer, trimer, tetramer, etc. so that the molecular weight of the condensate is an average of the several components making up the mixture.

This initial stage of reaction is carried out by heating the mixture in the range of 80° to 120° C. either at atmospheric pressure or at higher pressures. If water is evaporated during the reaction, in one embodiment it is largely condensed and returned to the reaction medium so that at least sufficient of the water volatilized is returned during the first stage to assure that the amount of water in the reaction medium at the end of this stage and at the beginning of the second stage wherein alcohol is added is not appreciably less than 25% based on the total weight of the reaction mixture before the addition of alcohol. The presence of water in the indicated amounts (i.e. from about 25% to 50%) is particularly important at lower formaldehyde to diamide ratios, i.e. for proper reaction the water must be present when the formaldehyde:diamide mole ratio is about 2.5 or less. At higher mole ratios, the water may be omitted, if desired.

In this first stage, the diamide is initially undissolved but within about 5 to 60 minutes or so from the start of refluxing, it dissolves and the reaction mixture clears.

After the clearing of the reaction mixture, the alcohol is added in a manner and at a rate such that excessive cooling of the reaction mixture does not occur. The temperature is maintained in the second stage in the range of about 75° to 170° C. and in this stage the water is gradually removed from the reaction mixture by distillation and separation from the stream of condensate refluxed to the reaction mixture. The heating is generally continued until essentially all the water including that initially present and that developed during the condensation is removed. This may take from about 4 to 24 hours or more depending on the size of the batch.

The resulting product is an alcoholic solution of the alkylated diamide/formaldehyde condensate, the concentration of which may vary from as low as 10 to 30% up to as high as 60 to 80% as desired. Generally, the preferred proportion of alcohol is from about 1.5 to 5 moles per mole of diamide used in making the initial formaldehyde condensate, but more dilute solutions would be obtained by using a larger proportion of the alcohol.

The alkylated condensates used in the compositions of the present invention are made in the aforesaid manner from the diamide/formaldehyde condensates in an initially aqueous alcoholic medium comprising at least one alcohol having from 1 to 8 carbon atoms, such as methanol, ethanol, n-propanol, isopropanol, n-butanol, n-pentanol, n-hexanol, and cyclohexanol. Preferred condensates are those obtained from a monohydric ($C_4$–$C_8$) alcohol having a branched structure or from an alcoholic material in which the predominant proportion of the alcohol content consists of such an alcohol. Examples of the latter alcohols include cyclohexanol and such secondary alkanols as sec-butanol, 2-hydroxypentane, 3-hydroxypentane, 2-hydroxy-3-methylbutane, 2-hydroxyhexane, 3-hydroxyhexane, 2-hydroxy-4-methylpentane, 3-hydroxy-4-methylpentane 2-hydroxyoctane, 3-hydroxy-octane, 2-ethylhexanol and 2-hydroxy-3,3-dimethylbutane. In preferred compositions, the alcoholic component is constituted by at least about 55% by weight of a branched ($C_4$–$C_8$)-alcohol or of a mixture of these alcohols, and is preferably formed of at least 75 to 95% or even 100% of these alcohols, any proportion of other ($C_1$–$C_8$)-alcohol such as ethanol, n-propanol, isopropanol, n-butanol, etc. being not over 45%. Mixtures of such alcohols, and especially of the branched alkanols are generally preferred as they are generally most reliable in producing alkylated diamide/formaldehyde condensates which remain amorphous over long periods of time on standing in storage under normal conditions of temperature and humidity. The branched $C_8$ alcohols, and especially 2-ethylhexanol, are particularly preferred.

The alcohol may be supplemented with another solvent of inert character, such as aliphatic, naphthenic, or aromatic hydrocarbons, including mineral, spirits, solvent naphthas, benzene, toluene, xylenes. The latter solvent may serve to aid in the removal of the water formed during the second stage of the reaction through azeotropic distillation. While hydrocarbons are generally used, the invention is not restricted thereto and any inert solvent may be used to supplement the alcohol.

The apparent ceasing of water removal or the subsequent clearing of the reaction mixture is a satisfactory indicator of the completion of the minimum extent of reaction required. However, the product need not be freed of water entirely. In many instances, it has been found that the presence of a small amount of residual or subsequently added water aids in stabilizing the product and in preventing the alkylated diamide/formaldehyde condensate from crystallizing out of the product which is in the form of a solution thereof.

Before cooling the reaction product, solvent may be stripped out by distillation to provide any desired solids concentration which may be about 30% to as high as 80% or higher by weight, though preferably from about 40 to 70%. The solvent used during the reaction may also be stripped and replaced in whole or part by another solvent. After cooling, and filtering, if desired, the reaction product may be diluted for use to any lower solids concentration, such as to 1 to 5%. Other solvents (besides the alcohols and hydrocarbons mentioned) that may be used include acetone, dioxane, methyl isopropyl ketone, the mono-($C_1$–$C_4$) alkyl and di-($C_1$–$C_4$) alkyl ethers of ethylene glycol, the monoacetate of diethylene glycol, etc.

Particularly preferred condensation products are those defined by the following formula

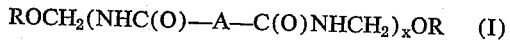

$$ROCH_2(NHC(O)—A—C(O)NHCH_2)_xOR \quad (I)$$

wherein A is a meta-phenylene group;
R is at least one member selected from the group consisting of H and the radicals of alcohols having from 1 to 8 carbon atoms; and
x is a number having a value of 1.5 to 3, and preferably from 1.8 to 2.5,
R being an alcohol radical in at least a portion of the condensation product.

It is apparent from the formula that the condensate may be a simple dimer when x is 2 and a simple trimer when x is 3 and the invention includes the pure dimer and the pure trimer. However, in general, the condensate is a mixture of two or more simple compounds in each of which x has a value of 1, 2, 3 or more, and hence the value of x for a given composition is actually an average value, i.e. a number representing the average of the value of the several components making up the mixture. The radical R may be that of a single alcohol or it may be different in the various components making up the mixture. It may be the radical of one or more alcohols in part of the condensate and hydrogen in another part of the condensate. Preferably, at least 75% up to 100% of the R constituent in the entire condensation product is the radical or radicals of one or more alcohols as defined.

Among the advantages of the preferred condensate and the process for producing it are (1) the fact that both stages (methylolation and alkylation) are effected at acid conditions, (2) no great change of pH or neutralization of the system is made at any time after initiating the reaction, and (3) there is no formation of salt-type by-products which would tend to render the cured products water-sensitive.

In contrast with the previously known compounds of definite composition and crystalline character, the preferred condensates of the present invention are surprisingly versatile and advantageous in that they are quite soluble in a wide variety of conventional solvents; they have good to excellent compatibility with a wide variety of other resinous materials including aminoplasts, phenoplasts, alkyds and polyepoxides; their coatings have exceptional resistance to heat, moisture and solvents, and also have excellent outdoor durability; and they are made from readily available materials and are not unduly expensive. Further, these preferred condensates, when used to modify alkyd resins, produce coatings characterized by an unusual combination of hardness, flexibility and adhesion such as is obtained with coatings of copolymers of acrylic amides and/or hydroxyl-containing esters modified with an alkylated diamide/formaldehyde condensate as described herein.

Alkyd resins

The alkyd resins wherein the novel condensates may be used are formed by first condensing a dibasic aromatic or aliphatic acid or anhydride having from 4 to 18 carbon atoms with a polyl, especially an aliphatic polyol having 2 to 10 carbon atoms, or a mixture of such polyols containing at least 25 mole percent of a polyol having three or more hydroxyl groups therein. For example, the polyol may contain up to 75 mole percent by weight of a diol, such as ethylene glycol, diethylene glycol, propylene glycol, dipropylene glycol, trimethylene glycol, 1,3-butane-diol, 1,4-butane-diol, and 1,5-pentane-diol. Examples of the polyols containing more than two hydroxyl groups that may be used include glycerol, sorbitol, pentaerythritol, inositol, tetramethylolcyclohexanol, di- and poly-pentaerythritol, and so forth, but tri-methylolethane, by which is meant the compound of the formula $CH_3C(CH_2OH)_3$, is preferred. Preferably, the proportion of diol is not over 50 mole percent of the entire polyol component and, of course, the diol may be completely absent.

The dicarboxylic acid or anhydride that is used may be adipic, succinic, glutaric, sebacic, phthalic, dihydrophthalic, tetrahydrophthalic, isophthalic, or terephthalic acid or anhydride. Preferably it contains from 5 to 8 carbon atoms, but it may contain 4 to 18 carbon atoms.

The polyol and dibasic acid or anhydride are mixed in the proportion of 1.2 to 1.8 moles of polyol to each mole of acid, preferably 1.2 to 1.5 moles of polyol being used for each mole of acid. The mixture is heated to a temperature within the range of about 200° to 260° C. in the presence of an inert gas such as carbon dioxide, nitrogen, argon, helium, when atmospheric or higher pressures are employed. If desired, a reduced pressure may be present during the reaction to remove the water formed on esterification and to favor a shift in the equilibrium toward the esterification product. Pressures of 20 to 50 mm. or more absolute pressure may be used. Optionally, an esterification catalyst may be used, such as 0.1 to 1% of sulfuric acid, toluenesulfonic acid, zinc chloride or phosphorus pentoxide. Such catalyst, however, is not necessary. The reaction is carried out until the acid number is reduced to a value of 10 or less. Preferably, the acid number is reduced to a value of less than 5. The polyester obtained has terminal hydroxyl groups and also some hydroxyl groups at intervals along the polyester molecule.

Instead of using the free dibasic acid itself as one of the starting materials in this esterification reaction, there may be used the lower alkyl diesters of the dibasic acids, such as the dimethyl or diethyl esters. Reaction in this case involves an ester interchange and sometimes has the advantage of yielding a product having less color. In this procedure, the alcohol is boiled off.

Optionally, the polyester may be modified with a fatty acid having 8 to 30 carbon atoms, such as lauric acid, stearic acid, oleic acid, linoleic acid, linolenic acid, palmitic acid, and ricinoleic acid. The modificaton may be effected by directly reacting the fatty acid with the polyol or with the hydroxyl-containing polyester; alternatively, the same result may be effected by transesterification, in which case an ester of the fatty acid, such as an ester thereof with glycerol, is reacted with the polyol or the hydroxyl-containing polyester in the presence of a suitable catalyst, such as an alkali metal alkoxide. There should be used from 1 to 3 moles of polyol or polyol mixture to each mole of the fatty acid (or the equivalent thereof in the case of an ester thereof when transesterification is employed); preferably there is used from about 1.2 to 1.5 moles of polyol to each mole of acid or equivalent of ester. When modification with a fatty acid is resorted to, it is preferable to react the monobasic fatty acid or its ester (in the case of transesterification) with the polyol or a part of it before the polyol is reacted with the dibasic acid. Thus, when a modified polyester is desired, the fatty acid or ester thereof, such as a fat or oil, is first mixed with the polyol or polyol mixture and the esterification or transesterification with the monobasic fatty acid is carried out under the same conditions as stated hereinabove in respect to the esterification with a dibasic acid. Thus, the temperature may be from 200° to 260° C.; the pressure from 20 mm. absolute up to atmospheric or higher, an inert gas being used preferably at atmospheric or higher pressures. Optionally, an esterification or transesterification catalyst may be used as before. The reaction is continued until the acid number reaches a value of 10 or less. Preferably, it is continued until the acid number reaches a value of less than 1. It is desirable that the monobasic acid be completely bound up in the ester product, and to this end the most desirable condition is attained when the acid number approaches or reaches a value of zero. The esterification product obtained from the polyol and monobasic acid is then mixed with the dibasic acid and any additional amount of polyol needed to bring the proportion of polyol used in the entire condensation reaction to a proportion of between 1.2 to 1.8 moles of polyol to one mole of the dibasic acid. This esterification reaction is continued under the same conditions as stated hereinabove in describing the preparation of the simple polyester unmodified with monobasic acid. As in the previous case, the reaction is continued until the acid number of the product is reduced to a value of 10 or less and preferably to a value of less than 5. The oil-modified polyester in this instance has some of its hydroxyl groups esterified with monoacyl radicals derived from the fatty acid. Of course, a mixture of fatty acids may be employed instead of a single one and similarly a mixture of dibasic acids may be employed instead of a single one, whether an oil-modified polyester or an unmodified polyester is to be prepared up to this point.

Alkylated melamine/formaldehyde condensate

Coating compositions prepared according to the invention comprise (A) an alkylated diamide/formaldehyde condensate and (B) a resin, which may be a copolymer of an amide and/or a free hydroxyl-containing ester of an alpha,beta-monoethylenically unsaturated acid or (in the case of the preferred condensate), an alkyd. In addition, preferred compositions of the invention contain (C) an alkylated melamine/formaldehyde condensate obtained from at least one saturated monohydric alcohol having 1 to 6 carbon atoms. The relative proportions between the diamide condensate and the melamine condensate rate from 70 to 95% by weight of the former and 30 to 5% by weight of the latter. In the composition there is from 70 to 95% by weight of resin (B) and 30 to 5% by weight of the mixture of condensates (A) and (C) in the case where resin (B) is a copolymer of an amide and/or a free carboxyl-containing ester of an α,β-monoethylenically unsaturated acid or from 50–95% by weight of resin (B) and 50–5% by weight of the mixture of condensates (A) and (C) in the case where resin (B) is an alkyd. Component (C) has the advantage of reducing the tendency to discolor in the event of overbaking.

The melamine condensate may be that of melamine itself or melamine-substituted on the amine nitrogen atoms with up to two alkyl groups having 1 to 4 carbon atoms. Of the substituted melamines, the dimethyl-substituted melamines are generally preferred. The melamine-formaldehyde condensate may contain from 2 to 6 methylol groups and from 2 to 6 of these groups may be alkylated by a monohydric alcohol, such as methanol, n-butanol, cyclohexanol, sec-butanol, sec-amyl alcohols, etc.

Coating compositions

The organic solvent in which the several components are dissolved may simply be an alcohol of suitable volatility, such as ethanol, n-propanol, isopropanol, n-butanol, sec-butanol, tert-butanol, cyclohexanol or mixtures thereof, or it may be formed of such other inert solvents as the aliphatic, naphthenic, or aromatic hydrocarbons, of which xylene, toluene, benzene, solvent naphthas, and mineral thinners are typical, ketones, such as acetone and methyl isobutyl ketone, ethers such as dioxane, the monomethyl and monoethyl ethers of ethylene glycol and esters such as the acetate of one of the monoethers just mentioned, etc. Any alcohol present in the solvent medium may be the same as or different from that present in one of the alkylated condensates.

The composition may comprise dyes, pigments, fillers, ultra-violet stabilizers, anti-oxidants, delustrants, plasticizers, and any other compatible film-forming components which latter may be of thermoplastic or thermosetting character. Examples of film-forming components include polyepoxides, cellulose derivatives, phenoplasts, other aminoplasts, such as alkylated urea-formaldehyde and alkylated N,N'-ethylene-urea/formaldehyde condensates, vinyl resins including poly(vinyl alcohol) and partially hydrolyzed poly(vinyl acetate), etc.

In applying the coating and impregnating compositions, whether or not they contain other binder materials, it is generally desirable, though not absolutely essential, to provide the composition with a curing catalyst of acidic character or a "latent" catalyst which develops acidity on heating during the baking operation. The amount of catalyst may be from 0.1 to 7% by weight, based on the weight of total solids, the higher proportions not ordinarily being needed except when the compositions contain a large proportion of pigment and/or filler. Examples of curing catalysts include the so-called Lewis acids such as zinc fluoborate, zinc perchlorate, aluminum chloride, ferric chloride, stannic chloride, titanium chloride, the corresponding bromides such as aluminum bromide and so forth, and boron trifluoride, especially its complexes such as with ethyl ether. There may also be used such acids as sulfuric acid, phosphoric acid, butylphosphoric acid, chlorosulfonic acid, alkyl or aromatic sulfonic acids such as o- or p-toluenesulfonic acid, or methanesulfonic acid, polyphosphoric acid, formic acid, maleic acid, oxalic acid and such latent catalysts as the monosalts of maleic or other acid with a tertiary amine such as triethylamine, triethanolamine and so on.

The compositions of the present invention are especially useful in the preparation of baking enamel-type coating composition for decorating and finishing rigid substrates, such as metals and wood, for example as automotive finishes where outdoor durability is important.

The coatings may be applied to all sorts of surfaces for a wide variety of purposes such as in metal decorating, providing protective coatings on aluminum siding, finishing metal furniture and cabinets, household appliances, etc. They are particularly desirable for application to primed surfaces of metals, such as iron, steel, copper, brass, aluminum, chromium, nickel, and the like; to glass, porcelain and other vitreous materials, to articles made of plastic materials, wood, textile fabrics, leather, paper, cardboard, and so on.

The concentration of the solution may vary widely from as low as about 1% solids to 75% solids, depending on the nature of substrate to which it is to be applied, the purpose of application, i.e. whether it is intended to penetrate or is intended to provide a more or less thick protective coating, and the manner of application, e.g. by dipping, brushing, spraying, or roll-transfer.

After application of the composition to a surface, it may be allowed to dry by exposure to normal atmospheric air currents. Alternatively, it may be dried by application of heated air, by application of infrared rays, radio frequency currents, or in any other suitable manner. After or during drying, curing is effected by heating to a temperature of about 105° to 400° C. or higher, but preferably from 125° to 150° C. for a period of time that generally is inversely proportional to the temperature and may be from about 10–15 seconds in the upper portion of the temperature range to an hour or so near the lower portion thereof. For example, 30 minutes at 150° C. is a quite practical combination. The combined factors of temperature and time depend, among other things as well, upon the particular solvent used and the thickness of coating.

In the following examples, which are illustrative of the invention, the parts and percentages are by weight unless otherwise indicated:

EXAMPLE 1

*Isophthalamide/formaldehyde/sec-amyl alcohol*

Charge:

A. Isophthalamide (1.5 moles) _____g__ 246
B. Aqueous formaldehyde (36.5%) (3.0 moles)
    _____g__ 247
C. sec-Amyl alcohol (3.0 moles) _____g__ 265
D. Formic acid (98%) _____ml__ 30
E. Xylene _____g__ 50

Equipment:

3-neck flask equipped with thermometer, mechanical stirrer, separator designed for removal of lower (aqueous) phase and return of upper (organic) phase, and reflux condenser.

Procedure:

The apparatus was first arranged for total reflux (i.e., the separator was omitted) and materials A, B and D were charged to the flask and the mixture heated to reflux (about 100–103° C.). Heating at reflux was continued until the reaction mixture became clear (about 15 minutes) at which point C and E were charged at a rate slow enough to maintain reflux conditions (reflux temp. gradually dropped to about 93° C.). With the addition of C and E completed, the reaction mixture was permitted to cool 2–3° below reflux and the separator was inserted in the vapor arm. The separator was filled with xylene so that the apparatus was now arranged for azeotropic distillation. Heating at reflux was resumed with continuous removal of aqueous phase until separation of aqueous phase had essentially ceased (about 136° C.; 211 cc. of aqueous phase collected). At this point, the reaction was considered essentially complete and the product was filtered hot. Yield: 622.0 g. of product at 72.4% solids having an average molecular weight of about 490. Viscosity (Gardner-Holdt): Z6+ (about 200 poise).

EXAMPLE 2

*Isophthalamide/formaldehyde/isobutyl alcohol*

Charge:

A. Isophthalamide (1.5 moles) _____g__ 246
B. Aqueous formaldehyde (36.5%) (4.5 moles)
    _____g__ 370
C. Isobutyl alcohol (4.5 moles) _____g__ 330
D. Formic acid (98%) _____ml__ 30
E. Xylene _____g__ 25

Equipment:

3-neck flask equipped with thermometer, mechanical stirrer, separator designed for removal of lower (aqueous) phase and return of upper (organic) phase, and reflux condenser.

Procedure:

Same general procedure as for Example 1, the only difference being that more aqueous phase was, of course, collected (about 320 ml.; final temperature 119° C.). The product was filtered hot. Yield: 687.0 g. at 68.1% solids having an average molecular weight of about 500. Viscosity (Gardner-Holdt): X— (about 12 poise).

EXAMPLE 3

*Isophthalamide/formaldehyde/methanol*

Charge:

A. Isophthalamide (1 mole) _____g__ 164
B. Aqueous formaldehyde (36.5%) (3 moles) _____g__ 247
C. Methanol (12 moles) _____g__ 384
D. Formic acid (98%) _____ml__ 20

Equipment:

3-neck flask equipped with thermometer, mechanical stirrer, and reflux condenser.

Procedure:

Materials A, B, and D were charged to the flask and the mixture heated to reflux (about 101° C.). Reflux was continued until the reaction mixture became clear and homogeneous (about 10 minutes), then C was charged. Reflux was continued for another hour—then the reaction mixture was cooled to room temperature.

The product at this point was completely water-soluble (average molecular weight of about 400) and was usable either as such (for aqueous systems) or was stripped essentially free of solvent under reduced pressure and diluted back with an organic solvent (viz isobutyl alcohol) for use in organic solvent-soluble coating systems.

EXAMPLE 4

*Isophthalamide/formaldehyde/cylcohexanol*

Charge:

A. Isophthalamide (1.5 moles) _____g__ 246
B. Aqueous formaldehyde (36.5%) (3.0 moles) _____g__ 247
C. Cyclohexanol (3.0 moles) _____g__ 300
D. Formic acid (98%) _____ml__ 30
E. Xylene _____g__ 25

Equipment:

Same as in Example 1.

Procedure:

Materials A, B, and D were charged to the flask and the mixture heated to reflux. Reflux was continued until the reaction mixture became clear and homogeneous (about 10 minutes). C was charged along with E. The apparatus was then arranged for azeotropic distillation by insertion of the separator in the vapor arm of the condenser. Reflux with continuous removal of aqueous phase was continued until separation of aqueous phase ceased (batch temperature about 164° C.). At this point the reaction mixture was very viscous. An additional 100 g. of cyclohexanol (i.e., in addition to the 300 g. initial charge) was added to the batch and the product was filtered hot.

Physical Constants:
Gardner-Holdt viscosity _____ V—
Solids _____percent__ 40
Average molecular weight _____ 600

EXAMPLE 5

*Solvent-free isophthalamide/formaldehyde/sec-amyl alcohol*

Charge: Grams
A. Isopthalamide (4.5 moles) _____ 740
B. Aqueous formaldehyde (37%) (11.25 moles) _____ 927
C. sec-Amyl alcohol (11.25 moles) _____ 990
D. Formic acid (90%) _____ 33
E. Xylene _____ 90

Equipment:

3-neck flask equipped with thermometer, mechanical stirrer, separator designed for removal of lower (aqueous) phase and return of upper (organic) phase, and reflux condenser.

Procedure:

The equipment was arranged for total reflux (i.e. the separator was omitted). Materials A, B and D were then charged to the flask and the mixture heated to reflux. Reflux conditions were maintained until the reaction mixture became clear (approx. 30 minutes), then C was charged while still maintaining the batch at reflux. When all of C was added, the batch was permitted to cool a few degrees below reflux temperature while E was charged and the separator was inserted in the vapor arm. The separator was filled with xylene and heating at reflux was resumed. Reflux with removal of aqueous phase was continued until separation of aqueous phase ceased. Solvent was then distilled from the batch under reduced pressure until the batch temperature reached ca. 140° to 160° C. or until the rate of distillate removal was virtually nil (the molten product was quite fluid at the elevated temperatures). The system was then vented and the product poured into a tray to cool. On cooling to room temperature, the mass was a friable solid and readily broke into small pieces on striking with a hammer or similar instrument.

EXAMPLE 6

*Isophthalamide/formaldehyde/tetrahydrofurfuryl alcohol condensate*

Charge:
A. Isophthalamide (1.0 mole) _____g__ 164
B. Aqueous formaldehyde (36.5%) (2.5 moles) _____g__ 206
C. Tetrahydrofurfuryl alcohol (2.5 moles) _g__ 255
D. Formic acid (98%) _____ml__ 10
E. Xylene _____g__ 30

Equipment:

3-neck flask equipped with thermometer, mechanical stirrer, separator designed for removal of lower (aqueous) phase and return of upper (organic) phase, and reflux condenser.

Procedure:

The same procedure was followed as in Example 5.

EXAMPLE 7

(a) 100 parts of the product obtained in Example 4 was mixed with 155 parts of a 60% solution in xylene of a commercially available oil-modified polyester alkyd resin formed from 40% phthalic anhydride, about 35% of trimethylolethane modified by 25% of a mixture of capric and myristic acids and 1.2 parts of a 30% solution in isopropanol of the triethylamine monosalt of maleic acid. The solution was cast into 5-mil clear films on cold rolled steel, air-dried, and baked at 300° F. for 30 minutes. The coated panels had a Knoop hardness number (KHN) of 13.3, a pencil hardness of 2H, the films showed no cracking after bending around a 1/8 inch diameter mandrel and showed good knife adhesion.

(b) When the product of Example 4 was replaced with a corresponding amount of butylated polymethylol melamine, the films showed similar hardness, only fair adhesion and much less flexibility, being severely cracked when bent around a 1/2 inch diameter mandrel.

EXAMPLE 8

(a) A pigmented composition was prepared in which 45 parts of titanium dioxide was mixed with 105 parts of the coating composition of part (a) in Example 7 giving a pigment to binder ratio of 45 to 55.

The coating composition was cast into a 5-mil film on cold-rolled steel, air-dried, and baked at 300° F. for 30 minutes. A hard, well-adhered flexible coating was produced.

(b) In similar manner, protective coatings which were flexible and adhered well to steel were obtained from similar pigmented compositions in which the condensate of Example 4 was replaced partly or completely with the analogous condensates of Examples 1 to 3, 5 and 6.

EXAMPLE 9

(a) To 200 parts of a 60% alkyd solution in xylene (the alkyd was a coconut oil-modified trimethylolethanephthalate made of about 35% coconut oil, 40% trimethylolethane, and 35% phthalic anhydride), was added 103 parts of a 50% solution in sec-butanol of a condensation product of isophthalamide, formaldehyde, and sec-butanol (the preparation of which is described in part (b) of this example), and 7.7 parts of a 20% zinc perchlorate solution in n-butanol (representing 3% catalyst based on isophthalamide condensate solids). This composition was spread onto cold-rolled steel to a 1.5 mil dried film thickness and baked at 250° F. for thirty minutes.

The clear coating so obtained had a 2H pencil hardness (as measured by graphitic drawing pencils), successfully passed a bend over a mandrel of 1/8 inch diameter, showed excellent knife adhesion, did not soften after one hour exposure to tap water, and softened only to an F pencil hardness after 15 minutes exposure to xylene or 2-ethoxyethyl acetate. Moreover, all of these properties were retained after the panel had been subjected to a heat treatment of 30 minutes at 400° F.

(b) *Preparation of isophthalamide/HCHO/sec-butanol condensate*

Charge:
A. Isophthalamide (0.5 mole) _____g__ 82
B. Paraformaldehyde (91%) (2.5 moles) __g__ 83
C. sec-Butyl alcohol (2.5 moles) _____g__ 185
D. Formic acid (98%) _____ml__ 3
E. Xylene _____g__ 20

Equipment:

3-neck flask equipped with thermometer, mechanical stirrer, separator designed for removal of lower (aqueous) phase and return of upper (organic) phase, and reflux condenser.

Procedure:

(1) The separator was filled with xylene and materials A, B, C, D, and E were charged to the flask and the mixture heated to reflux (about 101° C.).

(2) Reflux with removal of aqueous phase was maintained until separation ceased (about 14 ml.) at which time the batch temperature was 100° C.

(3) At this point the separator was drained of its contents and solvent was distilled directly from the reaction mixture (atmosphere pressure) to a solids contents of about 50% (about 80 g. of solvent stripped off). The product was then filtered.

Physical constants:
Viscosity (Gardner-Holdt) _____ I
Solids _____percent__ 50.4
Average mol. wt. _____ 500

EXAMPLE 10

(a) To 200 parts of a 60% alkyd solution in xylene (the alkyd was a cottonseed oil-modified glycerolphthalate made of about 45% cottonseed oil, 35% glycerol, and 20% phthalic anhydride) was added 27.2 parts of a 70% solution in ethanol of a condensation product of isophthalamide, formaldehyde, and sec-amyl alcohol (see preparation in part (b) of this example), 4.2 parts of a 50% solution in ¼ xylene/n-butanol of a butylated melamine-formaldehyde precondensate (see preparation in part (c) of Example 11), and 4.7 parts of a 30% solution in isopropanol of para-toluenesulfonic acid (representing 1% catalyst on total binder solids). This composition was spread onto cold-rolled steel to a 1.5 mil dried film thickness and baked at 250° F. for twenty minutes. For comparison, a clear film of the drying alkyd alone was also cast on cold-rolled steel and baked at 250° F. for twenty minutes.

The clear coating which contained the isophthalamide condensate had an F pencil hardness, greater than 50-inch-lbs. of reverse impact (as measured by a Gardner Laboratory Impact Tester), softened to 5B and 6B pencil hardness after 15 minutes exposure to xylene and 2-ethoxyethyl acetate respectively, and showed little tack when placed in contact with cheese cloth at 180° F. under a load of 2 p.s.i.

The clear coating of the drying alkyd alone had only a 3B pencil hardness, resisted only 15 to 20 inch-lbs. of reverse impact, became highly swollen but did not dissolve after 15 minutes exposure to xylene or 2-ethoxyethyl acetate, and showed considerable tack when heated at 180° F. in contact with cheese cloth under a load of 2 p.s.i.

(b) Preparation of ispophthalamide/HCHO/sec-amyl-alcohol

Example 5 was duplicated except that after the solvent was stripped from the product, the batch was diluted to about 70% solids with ethanol and filtered.

Physical constants:
  Viscosity (Gardner-Holdt) _____ P
  Solids _____ percent__ 70
  Average mol. wt. _____ 490

EXAMPLE 11

(a) Three enamels based on a non-drying alkyd, of the coconut oil-modified trimethylolethane-phthalate type (as in Example 9) were prepared according to the formulations given below:

PASTE PREPARED ON THREE ROLL MILL

| | A | B | C |
|---|---|---|---|
| Titanium dioxide pigment | 100.0 | 100.0 | 100.0 |
| Sixty percent solution in xylene of coconut oil-modified alkyd | 100.0 | 100.0 | 100.0 |
| Paste Letdown: | | | |
| (a) Sixty percent solution in xylene of coconut oil-modified alkyd | 117.0 | 117.0 | 117.0 |
| (b) Fifty percent solution in cyclohexanol of isophthalamide condensate described in part (b) of this example | 111.6 | 93.0 | 0.0 |
| (c) Fifty percent melamine/formaldehyde/n-butanol condensate in ¼ xylene/n-butanol described in part (c) of this example | 0.0 | 18.6 | 111.6 |
| (d) Thirty percent solution in isopropanol of the half triethylamine salt of maleic acid | 5.6 | 5.6 | 0.0 |
| (e) Xylene | 95.1 | 91.4 | 89.8 |
| (f) Diacetone alcohol | 31.7 | 30.4 | 29.9 |
| Enamel Constants: | | | |
| Pigment/Binder | 35/65 | 35/65 | 35/65 |
| Alkyd/isophthalamide and/or melamine condensates | 70/30 | 70/30 | 70/30 |
| Enamel solids at 19 seconds, No. 4 Ford cup (percent) | 51 | 51 | 52 |

These enamels were sprayed with conventional equipment onto Bonderite 100 panels to a dried film thickness 1.5 mils and baked in an air oven for thirty minutes at 300° F.

The coating from enamel A, cured with an isophthalamide condensate as the only aminoplast component, had a 3H pencil hardness, passed a bend over a ¼ inch mandrel, showed excellent knife adhesion, did not soften after fifteen minutes exposure to xylene, had a 97 gloss (as measured by the 60° Photovolt Gloss Meter), and exhibited good white color. Upon heating this coating an additional 16 hours at 350° F., a definite yellow color developed.

The coating from enamel B, cured at 300° F., with a blend of the isophthalamide condensate/melamine condensate in a 5 to 1 ratio, had properties essentially equivalent to those of enamel A. However, upon heating this coating an additional 16 hours at 350° F., the original white color was retained.

The coating from enamel C, cured at 300° F., with a melamine condensate as the only aminoplast component, had a 3H pencil hardness, only fair knife adhesion, poor flexibility as evidenced by the appearance of fine cracks when bent over a ½ inch mandrel, softened to a B pencil hardness after 15 minutes exposure to xylene, had a 92 gloss (as measured by the 60° Photocolt Gloss Meter), and showed good white color both initially and after an additional 16 hours bake at 350° F. Enamel C showed an undesirable viscosity progression after 2 months storage at room temperature. This progression was not observed in enamel A or B.

After six months exposure in Florida, facing south at 45°, all three coatings based on Formulations A, B and C showed excellent gloss, in excess of 90% of the original gloss.

(b) Preparation of isophthalamide/HCHO cyclohexanol

Charge:
  A. Isophthalamide (0.5 mole) _____ g__ 82
  B. Paraformaldehyde (91%) (1.5 moles) __ g__ 50
  C. Cyclohexanol (2.5 moles) _____ g__ 250
  D. Formic acid (98%) _____ ml__ 3
  E. Xylene _____ g__ 20

Equipment:
  Same as in Example 1.

Procedure:

(1) The separator was filled with xylene, then materials A, B, C, D and E were charged to the flask and the mixture heated to reflux (116° C.).

(2) Reflux with removal of aqueous phase was maintained until separation of aqueous phase ceased (about 33 ml.; reflux temperature: 162° C.).

(3) At this point, the separator was removed and the apparatus was arranged for reduced pressure distillation. The reaction mixture was then stripped under slightly reduced pressure to a solids content of about 50% (about 20 g. of solvent stripped off).

(4) The product was filtered through filter aid.

Physical constants:
  Gardner-Holdt viscosity _____ Z
  Solids _____ percent__ 49.9
  Average molecular weight _____ 600

(c) Preparation of melamine/formaldehyde/n-butanol condensate 126 parts of melamine, 405.5 parts of formalin (a 37% aqueous solution of formaldehyde) and 370.6 parts of n-butanol are introduced into the apparatus used in part (b) above. The reaction mixture is refluxed to a temperature of about 91° to 93° C. at atmospheric pressure for 6 to 8 hours. The water is removed by azeotropic distillation from the reaction mixture during the reflux operation using xylene in the separator. The vapor temperature will be about 100° to 105° C. The pressure is lowered sufficiently to reduce the vapor temperature to about 85° to 90° C. and the resin solution concentrated to about 65% solids by vacuum distillation. This solution is diluted with xylene and n-butanol to give a final composition of 10% xylene, 40% n-butanol and 50% resin solids.

EXAMPLE 12

A 60% alkyd solution in an aromatic solvent commercially available under the designation Solvesso 150 (the alkyd was a lauric acid-modified glycerol-phthalate from 30% lauric acid, 37% glycerol, and 33% phthalic anhydride), was formulated into an enamel as described below.

Paste prepared on three roll mill:
  Titanium dioxide pigment _____ 100.0
  Sixty percent solution in Solvesso 150 of lauric acid-modified alkyd _____ 100.0
Paste letdown:
  (a) Sixty percent solution in Solvesso 150 of lauric acid-modified alkyd _____ 50.0
  (b) Seventy percent solution in ethanol of the isophthalamide condensate described in Example 10(b) herein _____ 12.9
  (c) Fifty percent melamine/formaldehyde/n-butanol condensate in ¼ xylene/n-butanol described in Example 11(c) herein _____ 2.0
  (d) Solvesso 150 _____ 48.3
  (e) Diacetone alcohol _____ 16.1
Enamel constants:
  Pigment/binder _____ 50/50
  Allyd/combined isophthalamide and melamine condensates _____ 90/10
  Enamel solids at 60 seconds, #4 Ford cup percent__ 59

This enamel was applied to tin-plated steel by direct roller coating using a gelatin roll. The dried film, 0.2 to 0.3 mil in thickness, was baked at 400° F. for ten minutes.

The coating had good white color, a 91 gloss reading (as determined by the 60° Photovolt Gloss Meter), freedom from sticking together of sheets placed with the coated sides face to face or face to back under a load of 10 p.s.i. at 120° F. for 16 hours, and good fabricability as indicated by the excellent appearance of 28 mm. knurled and threaded screw caps which were prepared from the coated tin-plated sheets.

EXAMPLE 13

(a) To 100 parts of a 50% copolymer solution in 3/1 xylene/diacetone alcohol (the copolymer was produced by the solution copolymerization of 19.5 parts methyl methacrylate, 15.5 parts styrene, 60 parts ethyl acrylate, 3 parts acrylamide, and 2 parts methacrylic acid) was added 7.9 parts of a 70% solution in sec-butanol of a condensation product of adipamide, formaldehyde, and sec-butanol (the preparation of which is described in detail in part (b) of this example) and 0.3 part of a 30% solution of p-toluenesulfonic acid in isopropanol. This composition was cold blended and then spread onto cold rolled steel to a 1.5 mil dry film thickness and baked at 300° F. for 30 minutes. For comparison, a clear coating of the 50% copolymer solution alone was also spread onto cold rolled steel to a 1.5 mil dry film thickness and baked at 300° F. for 30 minutes.

The clear coating containing the adipamide condensate had an H pencil hardness, 30 inch-lbs., of reverse impact resistance, was insoluble in xylene and in 2-ethoxyethyl acetate and showed only slight tack when heated at 180° F. in contact with cheese cloth under a load of 2 p.s.i. The control had an HB pencil hardness, less than 2 inch-lbs, of reverse impact resistance, was soluble in xylene and in 2-ethoxyethyl acetate and showed a very heavy print when heated at 180° F. in contact with cheese cloth.

(b) Preparation of adipamide/HCHO/sec-butanol condensate

Charge:
  A. Adipamide (3 moles) _____ g__ 432
  B. Paraformaldehyde (91%) (9 moles) ___g__ 300
  C. sec-Butanol (12 moles) _____ g__ 888
  D. Formic acid (98%) _____ ml__ 18
  E. Toluene _____ g__ 180

Equipment:
  Same as in Example 1.

Procedure:
(1) The separator was filled with toluene and materials A, B, C, D and E were charged to the flask and the mixture heated to reflux (ca. 100° C.).

(2) Reflux with removal of aqueous phase was maintained until separation ceased (ca. 120 ml.; batch temp. 101° C.).

(3) At this point the separator was drained of its contents and solvent was distilled directly from the reaction mixture until the solids content was ca. 70% (ca. 600 g. of solvent stripped off). The product was then filtered.

Physical constants:
  Viscosity _____ G
  Solids _____ percent__ 70
  Xylene tolerance _____ cc./g__ 30/10

EXAMPLES 14–16

(a) To each of three 100 part portions of a 50% copolymer solution in 3/1 xylene/diacetone alcohol (the copolymer was produced by the solution copolymerization of 15.5 parts styrene, 15.5 parts of methyl methacrylate, 60 parts ethyl acrylate, 7 parts acrylamide and 2 parts methacrylic acid) was added an isophthalamide condensate, an adipamide condensate and an azelamide condensate and catalyst as set forth in the following table:

|  | Ex. 14 | Ex. 15 | Ex. 16 |
|---|---|---|---|
| (a) 50% copolymer solution | 100.0 | 100.0 | 100.0 |
| (b) 50% solution in cyclohexanol of isophthalamide/formaldehyde/cyclohexanol condensate of part (b) of Example 11 | 17.6 | | |
| (c) 42% solution in cyclohexanol of a dipamide/formaldehyde/cyclohexanol condensate (preparation shown in part (b)) | | 21.0 | |
| (d) 30% solution in cyclohexanol of azelamide/formaldehyde/cyclohexanol condensate (preparation shown in part (b)) | | | 29.3 |
| (e) 30% solution in isopropanol of p-toluenesulfonic acid | 0.9 | 0.9 | 0.9 |

Each of these compositions was spread onto cold rolled steel to a 1.5 mil dry film thickness and baked at 300° F. for 30 minutes. All three gave clear films which had a 2H pencil hardness and exhibited a lack of tack or stickiness when heated at 180° F. in contact with cheese cloth under a load of 2 lb./sq. in. However, the coatings of Examples 15 and 16 (i.e. the coatings cured by the adipamide condensate and the azelamide condensate, respectively) had 55 inch-lbs. of reverse impact resistance and softened to an HB pencil hardness after one hour exposure to deionized water. The coating of Example 14 (i.e. the coating cured by the isophthalamide condensate) had 6 inch-lbs. of reverse impact resistance and softened only to an H pencil hardness after one hour exposure to deionized water.

(b) Preparation of diamide condensates adipamide/HCHD/cyclohexanol condensate

Charge:
  A. Adipamide (3 moles) _____ g__ 432
  B. Paraformaldehyde (91%)(12 moles) __g__ 396
  C. Cyclohexanol (18 moles) _____ g__ 1800
  D. Formic acid (98%) _____ ml__ 2.5
  E. Xylene _____ g__ 75

Equipment:
  Same as in Example 1.

Procedure:

Essentially the same as for Example 13 except that xylene was used in place of toluene and the product was stripped to only 42% solids instead of 70%.

Physical constants:
- Viscosity _____ P–
- Solids _____percent__ 42

*Axelamide/HCHO/cyclohexanol condensate*

Charge:
- A. Azelamide (0.645 mole) _____g__ 120
- B. Paraformaldehyde (91%) (2.6 moles)__g__ 85
- C. Cyclohexanol (3.9 moles) _____g__ 368
- D. Formic acid (98%) _____ml__ 1.7
- E. Xylene _____g__ 60

Equipment:
Same as for Example 1.

Procedure:

Same as for Example 13 except that the final resin was reduced to 30% solids with cyclohexanol.

Physical constants:
- Viscosity _____ D
- Solids _____percent__ 30

EXAMPLES 17–19

In each of these examples, 29.8 parts of a 42% solution in cyclohexanol of a condensation product of adipamide, formaldehyde and cyclohexanol (the preparation of which is described in detail in part (b) of Example 11) were cold blended with 100 parts of a 50% copolymer solution as described hereinafter and 0.3 part of a 50% solution of dibutyl acid orthophosphate in n-butanol. In Example 17, the copolymer used in Examples 14–16 was used. In Example 18, the copolymer solution was in 1/1 xylene/diacetone alcohol and was obtained by the solution copolymerization of:

| | Parts |
|---|---|
| Methyl methacrylate | 10.5 |
| Styrene | 15.5 |
| Ethyl acrylate | 65 |
| Methacrylamide | 7 |
| Methacrylic acid | 2 |

In Example 19, the 50% copolymer solution was in diacetone alcohol and was obtained by the solution copolymerization of

| | Parts |
|---|---|
| Methyl methacrylate | 14 |
| Styrene | 14 |
| Ethyl acrylate | 60 |
| Methacryloxy acetamide | 10 |
| Methacrylic acid | 2 |

In each example, the cold blended mixture was spread onto cold rolled steel to 1.5 mil dry film thickness and baked at 400° F. for five minutes to give clear, adherent coatings. The following properties were measured at room temperature:

| | Ex. 17 | Ex. 18 | Ex. 19 |
|---|---|---|---|
| (1) Pencil hardness | 2H | 2H | H |
| (2) Pencil hardness after 15 minutes exposure to 2-ethoxyethylacetate | 6B | 6B | 6B |
| (3) Flexibility over 1/8 inch mandrel | (1) | (1) | (1) |
| (4) Reverse impact resis. (inch lbs.) | 55 | 50 | 30 |
| (5) Tack when heated at 180° F. in contact with cheese cloth under a load of 2 p.s.i. | (2) | (2) | (3) |
| (6) Appearance of clear film | (4) | (4) | (5) |

[1] No cracks.
[2] No print.
[3] Light print.
[4] Water white.
[5] Slight yellow cast.

EXAMPLE 20

The 50% copolymer solution of this example was in 2/1 xylene/diacetone alcohol and was obtained by the solution copolymerization of 61 parts styrene, 30 parts ethyl acrylate, 7 parts acrylamide, and 2 parts methacrylic acid. The preparation of the adipamide/HCHO/sec-butanol was described in detail in Example 13 herein. An enamel was prepared according to the formulation given below.

Paste prepared on three roll mill:
- Titanium dioxide pigment _____ 100.0
- Fifty percent copolymer solution _____ 100.0

Paste letdown:
- (a) Fifty percent copolymer solution _____ 98.2
- (b) Seventy percent solution in sec-butanol of adipamide/HCHO/sec-butanol condensate__ 33.2
- (c) Thirty percent solution in isopropanol of p-toluenesulfonic acid _____ 2.3
- (d) Xylene _____ 86.7
- (e) Diacetone alcohol _____ 86.7

Enamel constants:
- Pigment/binder _____ 45/55
- Acrylic/adipamide condensate _____ 81/19
- Enamel solids at 20 secs. #4 Ford cup _____percent__ 44

This enamel was sprayed with conventional equipment onto Bonderite 100 panels to a dried film thickness of 1.5 mils.

After a bake in an air oven for 30 minutes at 300° F. the following properties were measured at room temperature: a 4H pencil hardness, excellent flexibility over a 1/8 inch mandrel, high gloss (93 as measured by the 60° Photovolt Gloss Meter), a white visual color, softening to 2B pencil hardness after fifteen minutes exposure to 2-ethoxyethyl acetate, and good detergent resistance as evidenced by the appearance of only a few #8 blisters (as measured by ASTM D–714–54T photographic standards) after 48 hours exposure to a 1% Tide (a tradename for a built-alkyl aryl sulfonate detergent) solution in water at 165° F.

EXAMPLE 21

(a) A 50% copolymer solution in 2/1 Solvesso 100 (a tradename for an aromatic solvent)/diacetone alcohol of composition 91 parts ethyl acrylate, 7 parts acrylamide, and 2 parts methacrylic acid was formulated into an enamel with an isophthalamide condensate and a melamine condensate as indicated below.

Paste prepared on three roll mill:
- Titanium dioxide pigment _____ 100.0
- Fifty percent copolymer solution _____ 100.0

Paste letdown:
- (a) Fifty percent copolymer solution _____ 60.00
- (b) Seventy percent solution in ethanol of isophthalamide-formaldehyde-sec-amyl alcohol condensate (described in Example 10) ___ 25.7
- (c) Fifty percent solution in 1/4 xylene/n-butanol of melamine-formaldehyde-n-butanol condensate (described in part (c) of Example 11) _____ 4.0
- (d) Thirty percent solution in isopropanol of p-toluenesulfonic acid _____ 2.0
- (e) Solvesso 150 (a tradename for an aromatic solvent) _____ 9.6
- (f) Diacetone alcohol _____ 9.6

Enamel constants:
- Pigment/binder _____ 45/55
- Acrylic/aminoplast _____ 80/20
- Enamel solids at 77 sec., #4 Ford cup _____percent__ 64

This enamel was applied to tin-plated steel by direct roller coating using a gelatin roll. The dried film of 0.2 to 0.3 mil thickness was baked at 350° F. for 10 minutes.

This coating had very good hot stacking properties as evidenced by lack of sticking of sheets placed with the coated sides face to face or face to back under a load of 10 p.s.i. at 120° F. for 16 hours. Furthermore, the coating had an 80 gloss (as measured by the 60° Photovolt gloss meter) and excellent white color both after the original bake and an overbake of 30 minutes at 400° F. Very good fabricability of the coating was indicated by the lack of appearance of cracks when the coated tin-plated steel was subjected to sharp right angle bends with coating both on the inside and outside of the bend.

EXAMPLE 22

A 50% copolymer solution in xylene obtained by the solution copolymerization of 22.5 parts methyl methacrylate, 20.5 parts styrene, 45 parts ethyl acrylate, 10 parts beta-hydroxyethyl methacrylate, and 2 parts methacrylic acid was cold blended with an adipamide/formaldehyde/cyclohexanol condensate (the detailed preparation of which is described in part (b) of Example 15) in the following proportions:

|  | A | B |
|---|---|---|
| (a) Fifty percent copolymer solution | 100.0 | 100.0 |
| (b) Forty-two percent solution in cyclohexanol of adipamide/formaldehyde/cyclohexanol condensate | 24.4 | 24.4 |
| (c) Thirty percent solution in isopropanol of the half triethylamine salt of maleic acid | 0.0 | 1.1 |

These compositions were spread onto cold rolled steel to a 1.5 mil dried film thickness and baked at various temperatures and times.

Fully cured coatings had an H pencil hardness (as measured by graphitic drawing pencils), successfully passed a bend over a 1/8" mandrel, had 30 inch lbs. of reverse impact resistance (as measured by a Gardner Laboratory Impact Tester), and showed little or no tack when heated at 180° F. in contact with cheese cloth under a load of 2 p.s.i. The films softened to an HB pencil hardness after one hour exposure to room temperature water.

Full cure was obtained with formulation A containing no added catalyst by baking panels at 300° F. for thirty minutes or 350° F. for ten minutes. However, by addition of acid catalyst, as in formulation B, full cure was achieved at baking schedules of 250° F. for ten minutes or 300° F. for five minutes.

Both the catalyzed and uncatalyzed resin blends had good viscosity stability on prolonged storage.

EXAMPLE 23

The 50% copolymer solution of Example 22 herein was cold blended with an isophthalamide/formaldehyde/cyclohexanol condensate (the detailed preparation of which is described in part (b) of Example 11) and catalyzed by $Zn(ClO_4)_2$ as described below:

(a) Fifty percent copolymer solution ---------- 100.0
(b) Fifty percent solution in cyclohexanol of the isophthalamide / formaldehyde / cyclohexanol condensate ------------------------------- 31.0
(c) Twenty percent $Zn(ClO_4)_2$ solution in n-butanol ------------------------------- 3.3

This composition was spread onto cold rolled steel to a 1.5 mil dried film thickness and baked at 250° F. for thirty minutes.

The clear coating so obtained had a 2H pencil hardness, successfully passed a bend over a 1/8" mandrel, had 2 inch-lbs. of reverse impact resistance, showed no tack when heated in contact with cheese cloth under a load of 2 p.s.i., and did not soften when exposed to room temperature water for one hour.

EXAMPLE 24

A 50% copolymer solution in 9/1 xylene/n-butanol obtained by the solution of copolymerization of 15 parts methyl methacrylate, 50 parts butyl acrylate, 30 parts beta-hydroxypropyl methacrylate, and 5 parts methacrylic acid was cold blended separately with a melamine/formaldehyde/n-butanol condensate (described in part (c) of Example 11) and with a combination of an isophthalamide/formaldehyde/sec-amyl alcohol condensate (the preparation of which is described in Example 10) melamine/formaldehyde/n-butanol condensate. Enamel formulations for these two combinations are described below.

|  | Enamel A | Enamel B |
|---|---|---|
| Paste Prepared on Three Roll Mill: | | |
| Titanium dioxide pigment | 100.0 | 100.0 |
| Fifty percent copolymer solution | 100.0 | 100.0 |
| Paste Letdown: | | |
| Fifty percent copolymer solution | 110.0 | 110.0 |
| Seventy percent solution in ethanol of isophthalamide/formaldehyde/sec-amyl alcohol condensate | 57.9 | 0.0 |
| Fifty percent solution in 1/4 xylene/n-butanol of melamine/formaldehyde/n-butanol condensate | 9.0 | 90.0 |
| Xylene | 81.6 | 74.0 |
| n-Butanol | 40.8 | 37.0 |
| Solvesso 100 | 40.8 | 37.0 |
|  | 540.1 | 548.0 |
| Enamel Constants, on Solids Basis: | | |
| Pigment/Binder | 40/60 | 40/60 |
| Acrylic/Aminoplast | 70/30 | 70/30 |
| Enamel solids at 17", No. 4 Ford cup | 46.3 | 45.6 |

These enamels were sprayed with conventional equipment onto Bonerite 100 panels to a dried film thickness of 1.5 mils and baked in an air oven for thirty minutes at 300° F.

Both of the coatings from enamel A and enamel B had 3H pencil hardness, did not soften after 15 minutes exposure to xylene or to 2-ethoxyethyl acetate, showed no tack when heated at 180° F. in contact with cheese cloth under a load of 2 p.s.i., had high gloss (a gloss of 90 as measured by the 60° Photovolt Gloss Meter), and good white color both initially and after a 30 minute overbake at 400° F.

However, the coating from enamel A had flexibility over a 1/2 inch mandrel and good knife adhesion while the coating from enamel B showed severe cracking when bent over a 1/2 inch mandrel and had poor knife adhesion.

EXAMPLE 25

A 50% copolymer solution in 3/1 Solvesso 100/2-ethoxyethyl acetate obtained by the solution copolymerization of 24 parts styrene, 67 parts ethyl acrylate, 7 parts beta-hydroxypropyl methacrylate and 2 parts methacrylic acid was formulated into an enamel with an isophthalamide-based resin/melamine-based resin crosslinker as indicated below.

Paste prepared on three roll mill:
   Titanium dioxide pigment ---------------- 130.0
   Fifty percent solution of beta-hydroxypropyl methacrylate polymer ----------------- 70.0
Paste letdown:
   (a) Fifty percent solution of beta-hydroxypropyl methacrylate polymer ----------- 164.0
   (b) Seventy percent solution in ethanol of isophthalamide/formaldehyde/sec-amyl alcohol condensate (the preparation of which is described in Example 10) ------------ 16.7
   (c) Fifty percent solution in 1/4 xylene/n-butanol of melamine/formaldehyde/n-butanol condensate (the preparation of which is described in part (c) of Example 11) -- 2.6
   (d) Thirty percent solution in isopropanol of p-toluene sulfonic acid ------------------ 0.4
   (e) Cyclohexanol ------------------------ 75.0
                                               458.7

Enamel constants, on solids basis:
   Pigment/binder ------------------------ 50/50
   Acrylic/aminoplast --------------------- 90/10
   Enamel solids at 55" sec., #4 Ford cup percent-- 56.6

This enamel was applied to tin-plated steel, aluminum sheet, and black plate, by direct roller coating using a gelatin roll. The dried films of 0.2 to 0.3 mil thickness were baked at 350° F. for 10 minutes.

These coatings had very good hot stacking properties as evidenced by lack of sticking of sheets placed face to face or face to back under a load of 10 p.s.i. at 120° F. for 16 hours. Furthermore, the coatings had an 80 gloss (as measured by the 60° Photovolt Gloss Meter) and excellent white color both after the original bake and an overbrake of 30 minutes at 400° F. Moreover, the coatings were able to withstand severe fabrication without cracking (as in fabricating 28 mm. knurled and threaded screw caps from the coated sheets) and the severely fabricated pieces were able to resist one hour of dry heat at 250° F., or one hour of superheated steam at 250° F. without showing cracks or peeling failure.

EXAMPLE 26

(a) A sixty percent alkyd solution in xylene (the alkyd was a coconut oil-modified trimethylolethane phthalate as described in Example 7) was formulated into an enamel as described below.

Paste prepared on three roll mill:
  Titanium dioxide pigment _____ 100.0
  Sixty percent solution in xylene of coconut oil-modified alkyd _____ 100.0
Paste letdown:
  (a) Sixty percent solution in xylene of coconut oil-modified alkyd _____ 42.2
  (b) Seventy-four percent solution in xylene of 2-ethylhexanol/formaldehyde/isophthalamide condensate described in part (b) of this example _____ 44.6
  (c) Fifty percent melamine/formaldehyde/n-butanol condensate in ¼ xylene/n-butanol described in Example 11 (c) _____ 7.3
  (d) Thirty percent solution in isopropanol of the half triethylamine salt of maleic acid __ 3.7
  (e) Xylene _____ 103.0

───────
                                           400.8

Enamel constants:
  Pigment/binder _____ 45/55
  Alkyd/isophthalamide and melamine condensates _____ 70/30
  Enamel solids at 22 seconds, No. 4 Ford cup _____percent__ 55.4

This enamel was sprayed with conventional equipment onto cold rolled steel panels to a dried film thickness of 1.5 mils and baked in an air oven for thirty minutes at 300° F.

This coating had a pencil hardness of H, passed a bend over a ⅛ inch mandrel, showed excellent knife adhesion, had a gloss of 99 (as measured by the 60° Photovolt Gloss Meter) and did not soften appreciably in a 24 hour water soak at room temperature.

(b) *Preparation of isophthalamide/formaldehyde/ 2-ethylhexanol*

Charge:
  A. Isophthalamide (3.0 moles) _____g__ 492.0
  B. Aqueous formaldehyde (36.5%) (7.5 moles) _____g__ 616.0
  C. 2-ethylhexanol (7.5 moles) _____g__ 975.0
  D. Formic acid (98%) _____ml__ 20.0
  E. Xylene _____g__ 40.0
  F. Xylene _____g__ 425.0
Equipment:
  Same as in Example 1.
Procedure:
  The apparatus was arranged for total reflux. Materials A, B, and D were charged to the flask and the mixture heated to reflux. Reflux conditions were maintained until the reaction mixture cleared; then C and E were charged at such a rate that reflux conditions were maintained. After all of E was charged, the apparatus was arranged for azeotropic distillation with continuous removal of aqueous phase. Reflux with water removal was continued until separation of aqueous phase ceased (503 ml.; batch temp. 169° C.). The apparatus was then arranged for reduced pressure distillation. A solids determination on the batch at this point indicated 75.7% solids. Solvent was stripped from the batch under reduced pressure until the batch was at ca. 90% solids. The system was then vented and diluted back to ca. 73% solids with F.

Physical constants:
  Gardner-Holdt viscosity _____ Z4+
  Solids _____percent__ 73.6
  Xylene tolerance _____cc./g__ 70/10
  Acid No. _____ 0.6

While the examples illustrate the invention with reference to combinations of N,N'-bis(alkoxymethyl)diamide condensate with either an alkyd resin or an amide resin or a free-hydroxy-containing ester resin as described above, it is not intended to be limited thereto. Thus combinations of these materials with each other or other resinous materials may be used. In addition, the amide-containing monomers and the free hydroxy ester monomers may be copolymerized. When the alcohol/formaldehyde/isophthalamide condensate is used to modify an alkyd resin either of the unmodified or oil-modified type, the relative proportions of the alkyd to the condensate may be about 50 to 95% by weight of alkyd to about 50 to 5% by weight of the condensate or combined weight of the diamide condensate and an alkylated melamine/formaldehyde condensate.

While monomeric diamide condensates may be used to cross-link the amide and/or hydroxy ester resins, it is preferred that the condensate have a molecular weight greater than that of the N,N'-bis(alkoxymethyl)diamide corresponding to the alcohol from which the product is made, preferably in the range of about 400 to about 1000, the limits varying depending on the alcohol and the diamide.

It is to be understood that changes and variations may be made without departing from the spirit and scope of the invention as defined in the appended claims.

What is claimed is:

1. A condensation product of the formula $$ROCH_2(NHC(O)—A—C(O)NHCH_2)_xOR$$

wherein A is a meta-phenylene group,
R is at least one member selected from the group consisting of H and the radicals of alcohols having from one to eight carbon atoms, and
$x$ is a number having a value of 1.5 to 3, R being an aforesaid alcohol radial in at least a portion of the condensate.

2. A product as defined in claim 1 in which R is that radical of an alcohol in 75 to 100% by weight of the condensation product.

3. A product as defined in claim 1 in which R is methyl.

4. A product as defined in claim 1 in which R is 2-ethylhexyl.

5. A product as defined in claim 1 in which R is at least one branched aliphatic alcohol having three to eight carbon atoms.

6. A product as defined in claim 5 in which R is sec-amyl.

7. A product as defined in claim 5 in which R is iso-butyl.

8. A product as defined in claim 5 in which R is cyclohexyl.

9. A solution in an organic solvent of a condensation product of the formula

ROCH₂(NHC(O)—A—C(O)NHCH₂)ₓOR wherein A is a metal-phenylene group,
R is at least one member selected from the group consisting of H and the radicals of alcohols having from one to eight carbon atoms, and
x is a number having a value of 1.5 to 3, R being an aforesaid alcohol radical in at least a portion of the condensate.

10. A solution in an organic solvent of a condensation product as defined in claim 9 in which x is a number having a value of 1.8 to 2.5.

11. A composition according to claim 9 including an alkyd resin, the proportions of alkyd and condensate in the solution being about 50 to 95% by weight of the former and about 50 to 5% by weight of the latter.

12. A composition according to claim 9 including an alkyd resin and an alkylated melamine/formaldehyde condensate obtained by alkylation with at least one alcohol having one to six carbon atoms, the relative proportions between the isophthalamide and melamine condensates being 70 to 95 parts by weight, of the former and 30 to 5 parts by weight of the latter, and the relative proportions of alkyd and combined condensates being about 50 to 95 parts by weight of the alkyd to about 50 to 5 parts by weight of the condensates.

13. A method which comprises applying the composition of claim 11 to a substrate, drying and heating the resulting deposit to a temperature of about 105° to 400° C.

14. A method of producing a thermosettable condensation product which comprises heating, at a pH of 2 to 6 and at a temperature of about 80° to 120° C., a mixture of isophthalamide, formaldehyde, water, and acid in which the proportion of formaldehyde is from about 1.8 to about 3.2 moles per mole of isophthalamide and the water is present in an amount of about 25% to 50% by weight, based on the total weight of the mixture, the heating being continued until the reaction mixture clears and the water content of the mixure being maintained at a concentration of at least 25% throughout he heating, and then adding at least one alcohol having from 1 to 8 carbon atoms, while maintaining the temperature in the range of 75° C. to 150° C., the amount of alcohol added being at least 1.5 to 5 moles per mole of isophthalamide, whereby an alcoholic solution of an alkylation product of an isophthalamide/formaldehyde condensate is formed.

References Cited

UNITED STATES PATENTS

| | | | |
|---|---|---|---|
| 2,327,984 | 8/1943 | West | 260—850 |
| 2,364,737 | 12/1944 | McGrew | 260—850 |
| 2,825,714 | 3/1958 | Melamed | 260—72 |
| 2,834,756 | 5/1958 | Suen | 260—72 |
| 3,018,265 | 1/1962 | Tessmar | 260—850 |
| 3,050,495 | 8/1962 | Christenson | 260—850 |
| 3,081,278 | 3/1963 | Wohnsiedler | 260—850 |
| 3,102,868 | 9/1963 | Bolton et al. | 260—850 |

FOREIGN PATENTS

| | | |
|---|---|---|
| 671,141 | 12/1952 | Great Britain. |
| 862,869 | 3/1961 | Great Britain. |

OTHER REFERENCES

Walter and Storfer, Kolloid Beihefte 37, 378–84 (1933).
Pulvermacher, Ber. Deutsch Chem. Ges. 26, 956 (1893).

MURRAY TILLMAN, *Primary Examiner.*

P. LIEBERMAN, *Assistant Examiner.*